United States Patent
Hang et al.

(10) Patent No.: US 9,129,065 B2
(45) Date of Patent: Sep. 8, 2015

(54) USB DEVICE AND CONTROL METHOD THEREOF

(71) Applicant: Silergy Semiconductor Technology (Hangzhou) LTD, Hangzhou, ZheJiang Province (CN)

(72) Inventors: Kailang Hang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 13 days.

(21) Appl. No.: 14/155,124

(22) Filed: Jan. 14, 2014

(65) Prior Publication Data

US 2014/0207977 A1    Jul. 24, 2014

(30) Foreign Application Priority Data

Jan. 22, 2013    (CN) .......................... 2013 1 0023525

(51) Int. Cl.
*G06F 3/00* (2006.01)
*G06F 13/38* (2006.01)

(52) U.S. Cl.
CPC ................................... *G06F 13/385* (2013.01)

(58) Field of Classification Search
CPC .................................................. G06F 13/385
See application file for complete search history.

(56) References Cited

U.S. PATENT DOCUMENTS

| | | | |
|---|---|---|---|
| 8,447,893 B2 | 5/2013 | Tauscher et al. | |
| 8,572,420 B2 | 10/2013 | Dutton et al. | |
| 2010/0090644 A1* | 4/2010 | Nokkonen et al. | 320/107 |
| 2013/0166928 A1* | 6/2013 | Yang | 713/300 |
| 2013/0346650 A1 | 12/2013 | Uehara | |

FOREIGN PATENT DOCUMENTS

| | | |
|---|---|---|
| CN | 101667166 A | 3/2010 |
| CN | 102393837 A | 3/2012 |

* cited by examiner

*Primary Examiner* — Henry Tsai
*Assistant Examiner* — Jing-Yih Shyu
(74) *Attorney, Agent, or Firm* — Michael C. Stephens, Jr.

(57) ABSTRACT

In one embodiment, a universal serial bus (USB) device can include: (i) an interface module having a power supply port, a ground port, and first and second data ports, where the interface module is configured to connect to corresponding ports of a USB host at a USB interface; (ii) a property identification module coupled to the first and second data ports, where the property identification module is configured to determine properties of the USB interface; (iii) a data transmission module configured to exchange data between the USB device and the USB host according to the determined properties; and (iv) a charging module coupled to the power supply port and the ground port, where the charging module is configured to charge the USB device based on the determined properties.

13 Claims, 10 Drawing Sheets

USB DEVICE AND CONTROL METHOD THEREOF

RELATED APPLICATIONS

This application claims the benefit of Chinese Patent Application No. 201310023525.2, filed on Jan. 22, 2013, which is incorporated herein by reference in its entirety.

FIELD OF THE INVENTION

The present invention relates to field of communication electronics, more particularly to a USB device and an associated control method.

BACKGROUND

In current communication electronic technology, a universal serial bus (USB) is commonly used to form a serial communication channel. For example, most computers and laptops use USB interfaces to connect to peripheral devices (e.g., mouse, keyboard, joystick, scanner, external drivers, etc.). Computers can use USB technologies to perform data exchange with portable devices, such as music players, mobile phones, or tablet PCs, while also charging these devices. In such arrangements, the computer may be viewed as a USB host, and the connected peripherals can be viewed as USB devices.

SUMMARY

In one embodiment, a universal serial bus (USB) device can include: (i) an interface module having a power supply port, a ground port, and first and second data ports, where the interface module is configured to connect to corresponding ports of a USB host at a USB interface; (ii) a property identification module coupled to the first and second data ports, where the property identification module is configured to determine properties of the USB interface; (iii) a data transmission module configured to exchange data between the USB device and the USB host according to the determined properties; and (iv) a charging module coupled to the power supply port and the ground port, where the charging module is configured to charge the USB device based on the determined properties.

In one embodiment, a method of controlling a USB device can include: (i) connecting, by USB interface, a power supply port, a ground port, and first and second data ports to corresponding ports of a USB host; (ii) determining properties of the USB interface according to signals at the first and second data ports; (iii) performing data exchange between the USB device and the USB host according to the determined properties; and (iv) charging the USB device according to the determined properties.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1A:
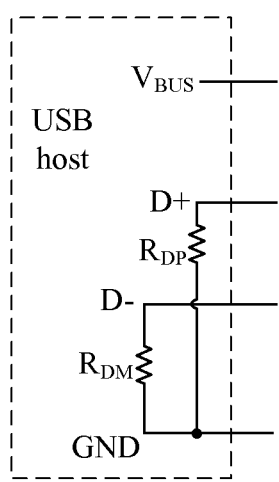
FIG. 1A shows a first internal schematic view of an example USB host.
Figure 1B:
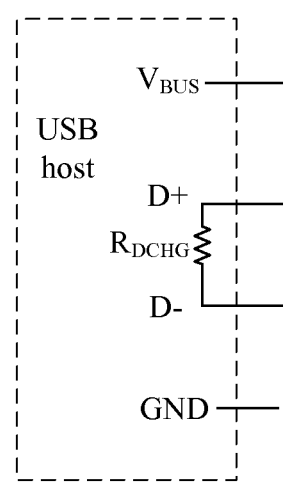
FIG. 1B shows a second internal schematic view of an example USB host.
Figure 1C:
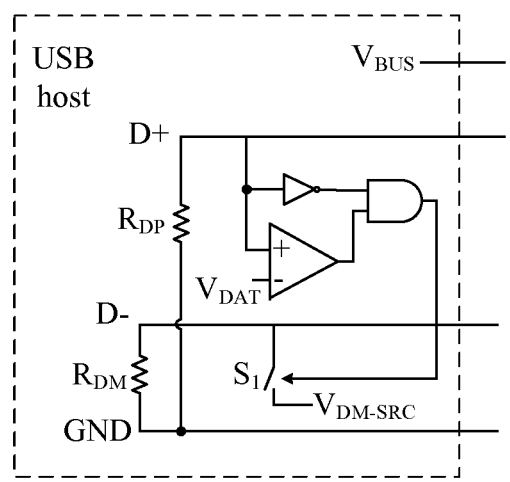
FIG. 1C shows a third internal schematic view of an example USB host.

Referring now to FIGS. 1A-1C, shown are three examples of different internal schematic structures of universal serial bus (USB) hosts. Once a USB device is connected to the USB host, USB interface properties can be determined according to the particular internal circuit structure of the USB host. Additionally, an open state of the USB interface can be determined when the USB device is not connected to any USB host. A USB interface can be the interface between a USB host (e.g., as represented by one of FIGS. 1A-1C) and a USB device, and can include one or more ports, signals, and/or connections. Such properties can be utilized to determine whether the USB host and USB devices are to perform data exchange, and also how to regulate the charging current in the USB device. In one case, a property identification circuit within the USB device can couple ports in the interface module (e.g., $V_{BUS}$ port, data port D+, data port D−, etc.), and can compare a signal (e.g., voltage) at a given port, such as the $V_{BUS}$ port.

When a universal serial bus (USB) is used to communicate, and once portable devices (e.g., mobile phones, MP3 players, iPads, etc.) are connected (e.g., via a USB cable/connector) to a USB socket of a computer, data exchange between the USB host (e.g., the computer) and USB device (e.g., a portable device) can be performed. In addition, the USB device can charge its own battery by using electrical energy provided by the computer or USB host via the USB interface (e.g., via the $V_{BUS}$ port). In particular embodiments, based on the determined properties of the USB interface, data exchange between the USB host and USB device, as well as charging parameters (e.g., charging currents within the USB device) can be regulated.

In one embodiment, a USB device can include: (i) an interface module having a power supply port, a ground port, and first and second data ports, where the interface module is configured to connect to corresponding ports of a USB host at a USB interface; (ii) a property identification module coupled to the first and second data ports, where the property identification module is configured to determine properties of the USB interface; (iii) a data transmission module configured to exchange data between the USB device and the USB host according to the determined properties; and (iv) a charging module coupled to the power supply port and the ground port, where the charging module is configured to charge the USB device based on the determined properties.

Figure 2:
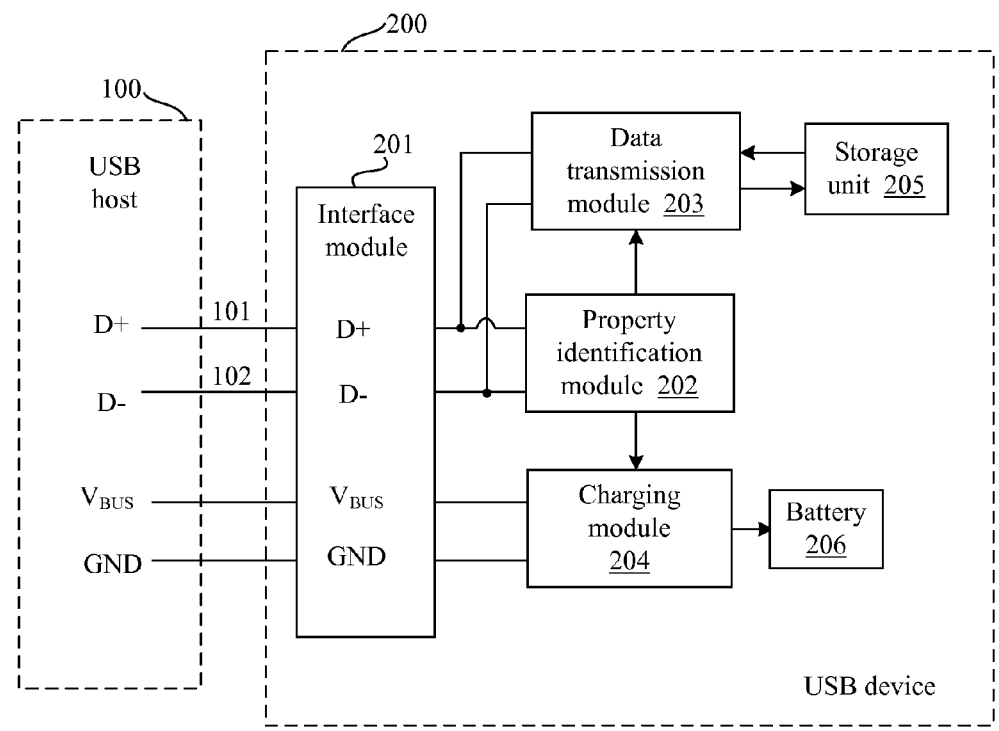
FIG. 2 is a schematic block diagram of a first example USB device in accordance with embodiments of the present invention.

Referring now to FIG. 2, shown is a schematic block diagram of a first example USB device in accordance with embodiments of the present invention. USB host 100 can be coupled to USB device 200 via corresponding ports. USB device 200 can include interface module 201, which can include power supply port $V_{BUS}$, ground port GND, data port D+, and data port D−. USB device 200 can also include property identifier or identification module 202, data transmitter or transmission module 203, and charger or charging module 204. As used herein, a "module" can be a circuit, circuit portion, integrated circuit (IC), or other hardware structure. In some cases, a module may also be controllable via software, such as in a combination of hardware and software.

Property identification module 202 can be coupled to data ports D+ and D−. Data ports D+ and D− of USB host 100 can connect to internal circuitry of USB device 200 via interface connections 101 and 102, as shown. Properties of the USB interface can be determined by property identification module 202 according to the structure of USB host 100 (e.g., that of FIG. 1A, FIG. 1B, or FIG. 1C). The determination result can be sent from property identification module 202 to data transmission module 203 and charging module 204. In this fashion, data exchange between USB host 100 and USB device 200, as well as charging a battery 206 on USB device 200, can be controlled or regulated based on the determined properties of the USB interface.

Data transmission module 203 can be coupled between data ports D+ and D− in interface module 201, and storage unit 205. Based on the particular properties of the USB interface, data found in storage unit 205 may be exchanged with data from USB host 100. For example, data can be read from storage unit 205 and sent to USB host 100, and/or data can be accessed from USB host 100 and stored in storage unit 205. Charging module 204 can be coupled to power supply port $V_{BUS}$, ground port GND, and battery 206 of USB device 200. Charging module 204 can regulate the charging current of battery 206 based upon properties of the USB interface. For example, USB host 100 can include a computer, a laptop, a standard USB charger, etc., and USB device 200 can include a mobile communication device, a music player, an iPad tablet, etc., and generally may include any device capable of being connected to another device via a USB interface.

Figure 3:
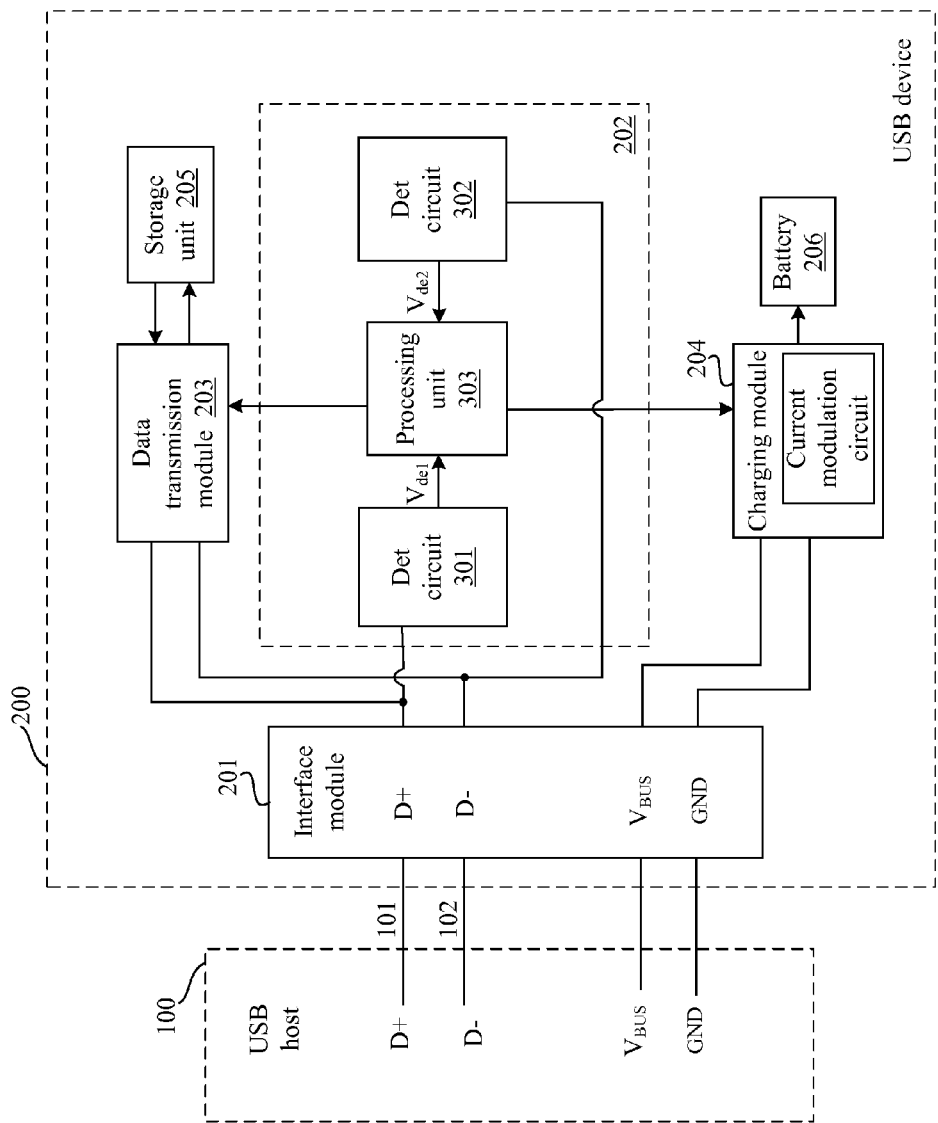
FIG. 3 is a schematic block diagram of a second example USB device in accordance with embodiments of the present invention.

Referring now to FIG. 3, an example USB device can include further details of property identification module 202. In this particular example, property identification module 202 can include determination circuits 301 and 302, and processing unit 303. Determination circuit 301 can be coupled to data port D+, and determination signal $V_{de1}$ can be generated according to the internal structure of USB host 100. Also, determination circuit 302 can be coupled to data port D−, and can be used to generate determination signal $V_{de2}$. Determination circuits 301 and 302 can be any suitable circuits or structures for detecting information (e.g., currents, voltages, etc.) related to a signal on the corresponding data port (e.g., D+, D−, etc.).

Processing unit 303 (e.g., a general purpose processor, microcontroller, central processing unit [CPU], etc.) can receive determination signals $V_{de1}$ and $V_{de2}$, and use them to determine properties of the USB interface. In this way, properties of the USB interface can be determined according to the states (e.g., logic high, logic low, voltage or current levels versus a predetermined level, etc.) of determination signals $V_{de1}$ and $V_{de2}$. In addition, charging module 204 can include a current modulation circuit for regulating the charging current of battery 206 according to the properties of the USB interface.

The current modulation circuit can change or limit the current (e.g., derived from power supply port $V_{BUS}$) that is used to charge battery 206 on USB device 200. Thus, power or electrical energy from USB host 100 can be employed in the charging of battery 206 on USB device 200. However, this charging can be regulated based on the determined properties of the USB interface between the USB host and USB device. For example, if determination signal $V_{de1}$ is active high and determination signal $V_{de2}$ is inactive low, processing unit 303 can determine that the USB interface is in an open state. For example, an "open state" can be when USB device 200 is not connected to USB host 100, and thus in this case data transmission module 203 and charging module 204 may be disabled.

As another example, if determination signals $V_{de1}$ and $V_{de2}$ are both inactive low, processing unit 303 can determine that the USB interface includes a standard downstream port (SDP). For example, an SDP can indicate that at least one port of USB host 100 is a standard USB port that can support charging of USB device 200, and also data transmission or exchange between the USB host and USB device. Data transmission module 203 can perform data exchange between storage unit 205 and USB host 100. Also, electrical energy from USB host 100 may be transferred to charging module 204 via power supply port $V_{BUS}$, and ground port GND. Further, the charging current of battery 206 can be regulated as a first current via the current modulation circuit in charging module 204. For example, the first current may have a maximum value of about 0.5 A.

As another example, when determination signal $V_{de1}$ is inactive low and determination signal $V_{de2}$ is active high, processing unit 303 can determine that the USB interface includes a charging downstream port (CDP). A CDP determination can indicate that the USB interface supports data transmission, and can also rapidly charge USB device 200. Thus, the current modulation circuit in charging module 204 can control battery 206 charging current to be a second current. For example, the second current may have a maximum value of about 1.5 A (greater than the first current).

In yet another example, when determination signals $V_{de1}$ and $V_{de2}$ are both active high, processing unit 303 can determine that the USB interface includes a dedicated charging port (DCP). A DCP can indicate that the USB interface does not support data transmission, and may only support device charging. Therefore, data transmission module 203 can be disabled in this situation, and charging module 204 can charge USB device 200 at a third current. In one case (see, e.g., Battery Charging Specification Revision 1.1), the maximum value of the third current can be about 1.8 A, while in another case (see, e.g., Battery Charging Specification Revision 1.2), the third current can be in a range of from about 0.5 A to about 5 A.

In particular embodiments, a USB device can include a property identification module coupled to data ports via an interface module, and without needing to detect and/or compare a voltage at the $V_{BUS}$ port. By using determination signals obtained via input signals at data ports, properties of the USB interface between the USB host and USB device can be determined. Further, operation of the data transmission module (e.g., 203) and the charging module (e.g., 204) on the USB device can be controlled according to the determined properties of the USB interface. Due to the relatively simple circuit structure of this approach, manufacturing costs of the overall USB device can be reduced as compared to other approaches, and product integration can be enhanced.

Figure 4:
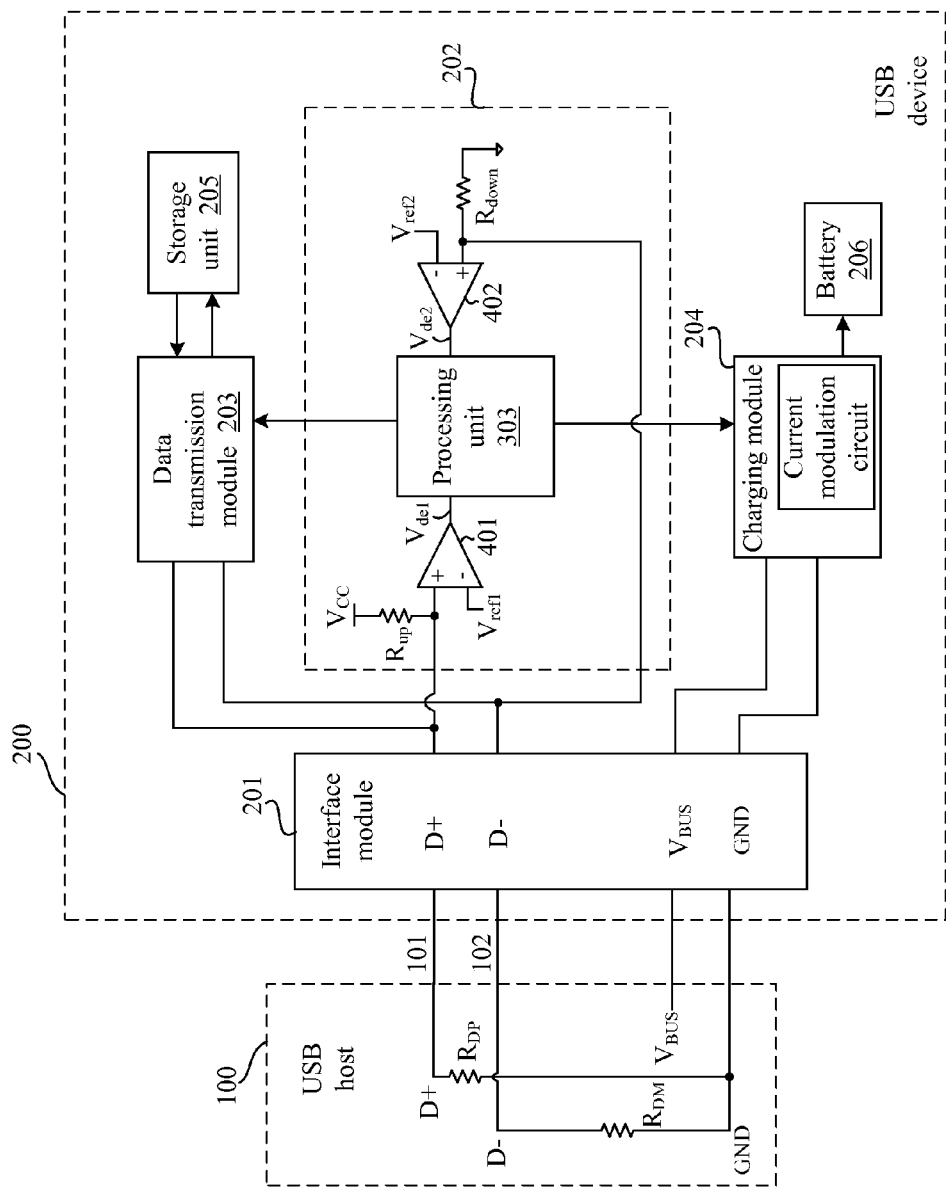
FIG. 4 is a schematic block diagram of an example USB device connected to the example USB host of FIG. 1A, in accordance with embodiments of the present invention.

Referring now to FIG. 4, shown is a schematic block diagram of an example USB device connected to the example USB host of FIG. 1A, in accordance with embodiments of the present invention. In this particular example, determination circuit 301 can include pull-up resistor $R_{up}$ and comparator 401. Pull-up resistor $R_{up}$ can connect between input power supply $V_{CC}$ and data port D+. The in-phase input of comparator 401 can receive a signal at a common node of pull-resistor $R_{up}$ and data port D+, for comparison against reference voltage $V_{ref1}$, which can connect at the inverted input of comparator 401. Comparator 401 can output determination signal $V_{de1}$ to processing unit 303.

Determination circuit 302 can include pull-down resistor $R_{down}$ and comparator 402. Pull-down resistor $R_{down}$ can connect between data port D− and ground. The in-phase input of comparator 402 can receive a signal at a common node of pull-down resistor $R_{down}$ and data port D−. This signal be compared against reference voltage $V_{ref2}$, which can be received at the inverted of comparator 402. Comparator 402 can output determination signal $V_{de2}$ to processing unit 303.

Those skilled in the art will recognize that various circuit parameters, sizes, values, and/or ratios of different signals can be utilized in particular embodiments. In practical applications, various parameters can be modified according to operating conditions, or other application considerations. For example, input power supply $V_{CC}$ can be about 5V, reference voltage $V_{ref1}$ can be about 2V, reference voltage $V_{ref2}$ can be about 0.3V, and pull-up resistor $R_{up}$ and pull-down resistor $R_{down}$ can each be about 150 kΩ. Of course, other values, circuit elements, or circuit arrangements, can be supported in particular embodiments.

When USB device 200 is not connected to USB host 100, voltage $V_{D+}$ at the in-phase input of comparator 401 can be about 5V, and voltage $V_{D-}$ at the in-phase input of comparator 402 can be about 0V. Thus, determination signal $V_{de1}$ can be high (e.g., active), and determination signal $V_{de2}$ can be low (e.g., inactive). As a result, data transmission module 203 and charging module 204 can both be disabled. This is an example of an open state property determination for the USB interface.

In USB host 100, resistors $R_{DP}$ and $R_{DM}$ can respectively connect between internal data ports D+ and D− and ground. Voltage $V_{D+}$ at the in-phase input of comparator 401 can be denoted by the following formula (1).

$$V_{D+} = V_{CC} \frac{R_{DP}}{R_{DP} + R_{up}} \quad (1)$$

From the battery charging specifications discussed above, the resistance value of resistor $R_{DP}$ can be from about 14.25 kΩ to about 24.8 kΩ, and the voltage of data port D+ ($V_{D+}$) can be from about 0.443V to about 0.709V (less than reference voltage $V_{ref1}$), determination signal $V_{de1}$ can be low. Since the voltage of data port D− ($V_{D-}$) at the in-phase input of comparator 402 may remain 0V, and determination signal $V_{de1}$ may also be low, the USB interface can be detected as a standard downstream interface. In response to this USB interface property determination, data transmission module 203 may perform data exchange, and charging module 204 can charge battery 206 at the first current.

Figure 5:
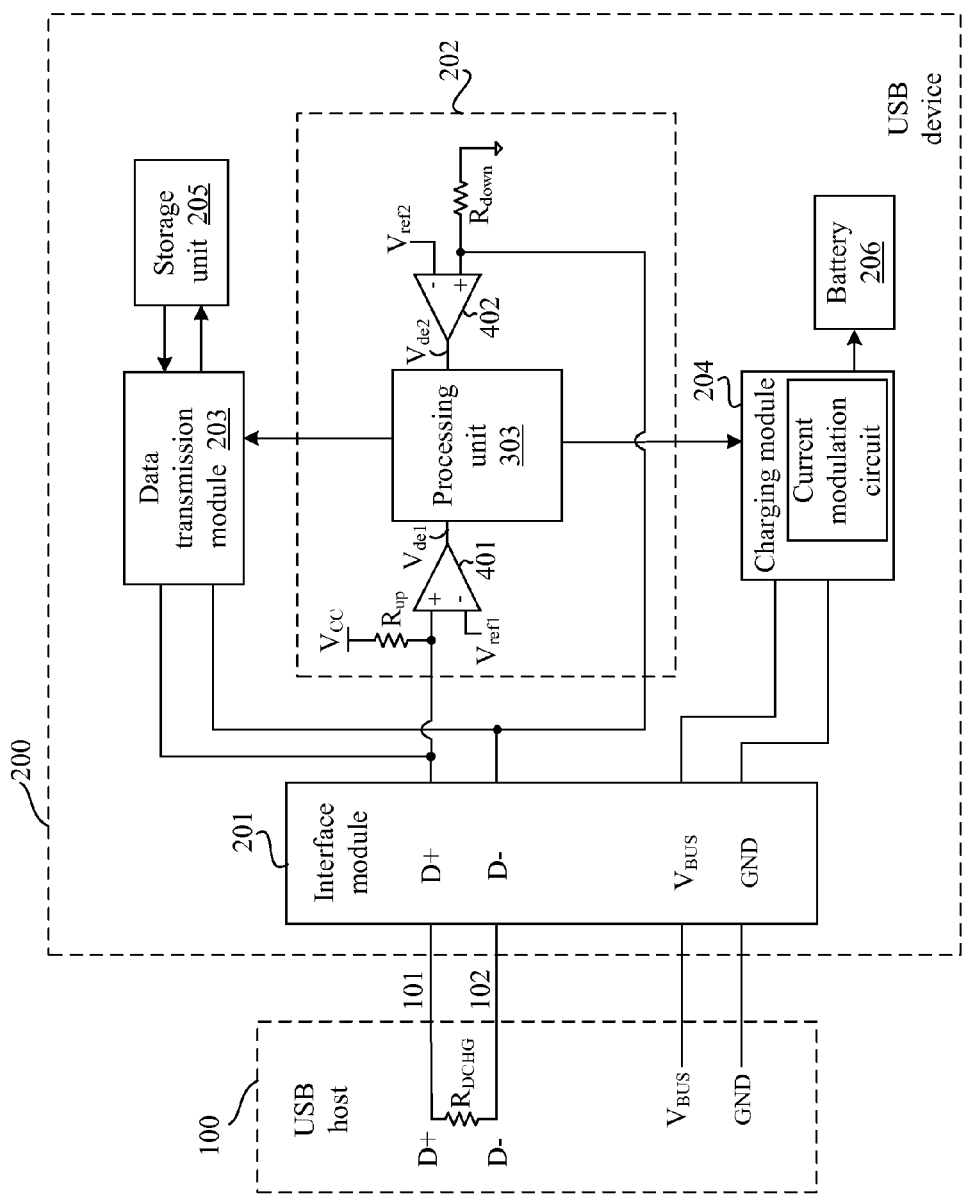
FIG. 5 is a schematic block diagram of an example USB device connected to the example USB host of FIG. 1B, in accordance with embodiments of the present invention.

Referring now to FIG. 5, shown is a schematic block diagram of an example USB device connected to the example USB host of FIG. 1B, in accordance with embodiments of the present invention. In this particular example, resistor $R_{DCHG}$ can connect between internal data ports D+ and D− of USB host 100. Also, according to Battery Charging Specification Revision 1.1, the resistance value of resistor $R_{DCHG}$ is less than 200Ω, and much less than the resistance value of pull-up resistor $R_{up}$ and pull-down resistor $R_{down}$.

Therefore, input power supply $V_{CC}$ can be voltage-divided at pull-up resistor $R_{up}$ and pull-down resistor $R_{down}$, and voltage $V_{D+}$ at the in-phase input of comparator 401 and voltage $V_{D-}$ at the in-phase input of comparator 402 may both be about 2.5V, which may be considered a logic high. In addition, determination signals $V_{de1}$ and $V_{de2}$ can be high, and the USB interface can be determined as a dedicated charging port. In response to this USB interface property determination, data transmission module 203 may be disabled, and charging module 204 can charge USB device 200 at the third current.

Figure 6:
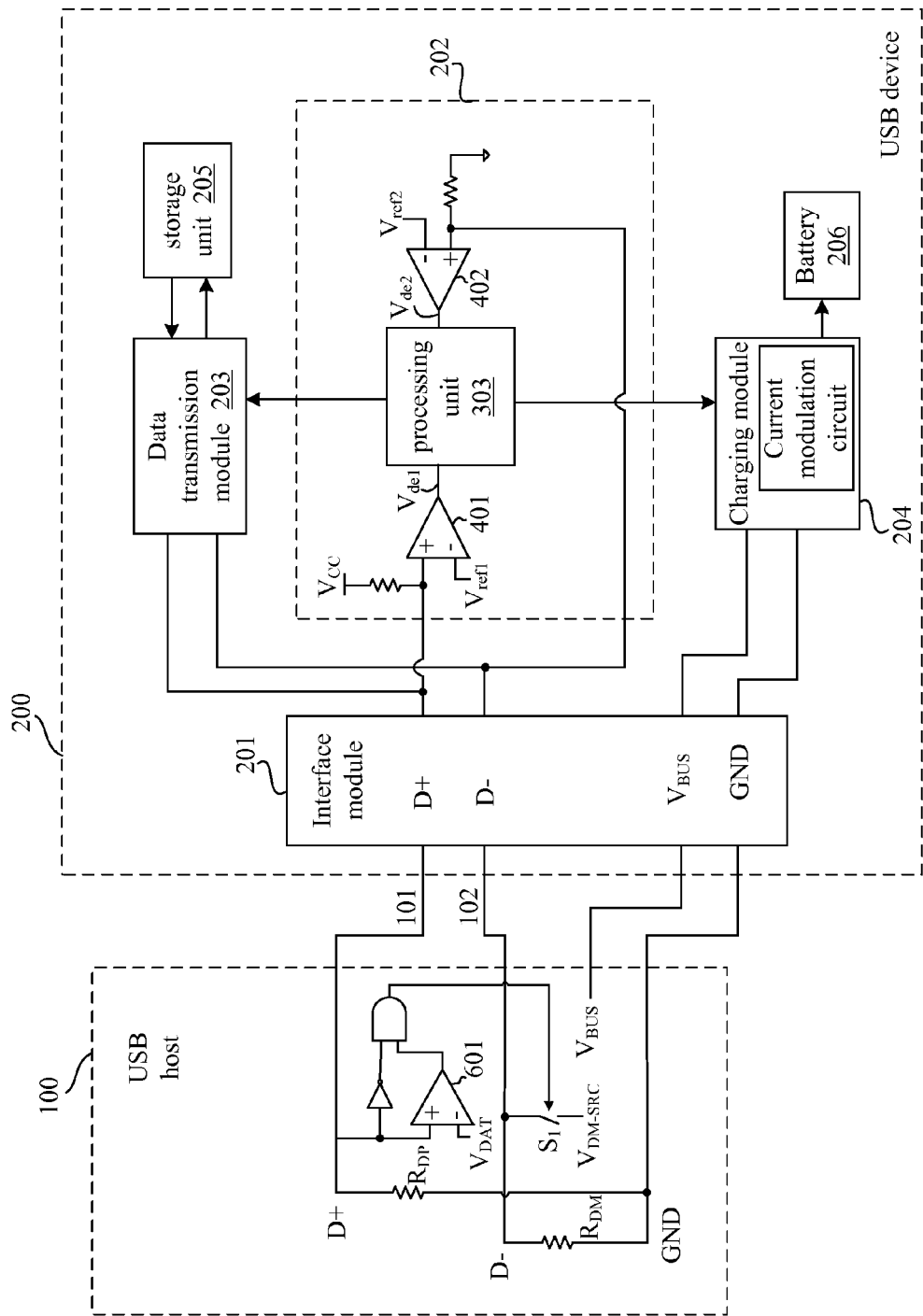
FIG. 6 is a schematic block diagram of an example USB device connected to the example USB host of FIG. 1C, in accordance with embodiments of the present invention.

Referring now to FIG. 6, shown is a schematic block diagram of an example USB device connected to the example USB host of FIG. 1C, in accordance with embodiments of the present invention. In this case, USB host 100 can include an AND-gate, an inverter, comparator 601, switch $S_1$, and clamping voltage source $V_{DM-SRC}$. Based on Battery Charging Specification Revision 1.2, voltage $V_{DAT}$ at comparator 601 can be from about 0.25V to about 0.4V, where a voltage value of a logic high level can be above 2V, and clamping voltage source $V_{DM-SRC}$ can be from about 0.5V to about 0.7V.

Therefore, from formula (1) above, it can be seen that the value range of the in-phase input voltage $V_{D+}$ of comparator 401 can be below the logic high level but above voltage $V_{DAT}$. As a result, the output of the AND-gate can be a logic high to control switch $S_1$ to turn on, and the voltage of data port D− can be clamped to a value between about 0.5V and about 0.7V (greater than reference voltage $V_{ref2}$). Thus, when determination signal $V_{de1}$ is low and determination signal $V_{de2}$ is high, the USB interface can be determined as being in a charging downstream state. In the charging downstream state USB interface property determination, data transmission module 203 can perform data exchange, and charging module 204 can charge USB device at the second current.

In one embodiment, a method of controlling a USB device can include: (i) connecting, by USB interface, a power supply port, a ground port, and first and second data ports to corresponding ports of a USB host; (ii) determining properties of the USB interface according to signals at the first and second data ports; (iii) performing data exchange between the USB device and the USB host according to the determined properties; and (iv) charging the USB device according to the determined properties.

Figure 7:
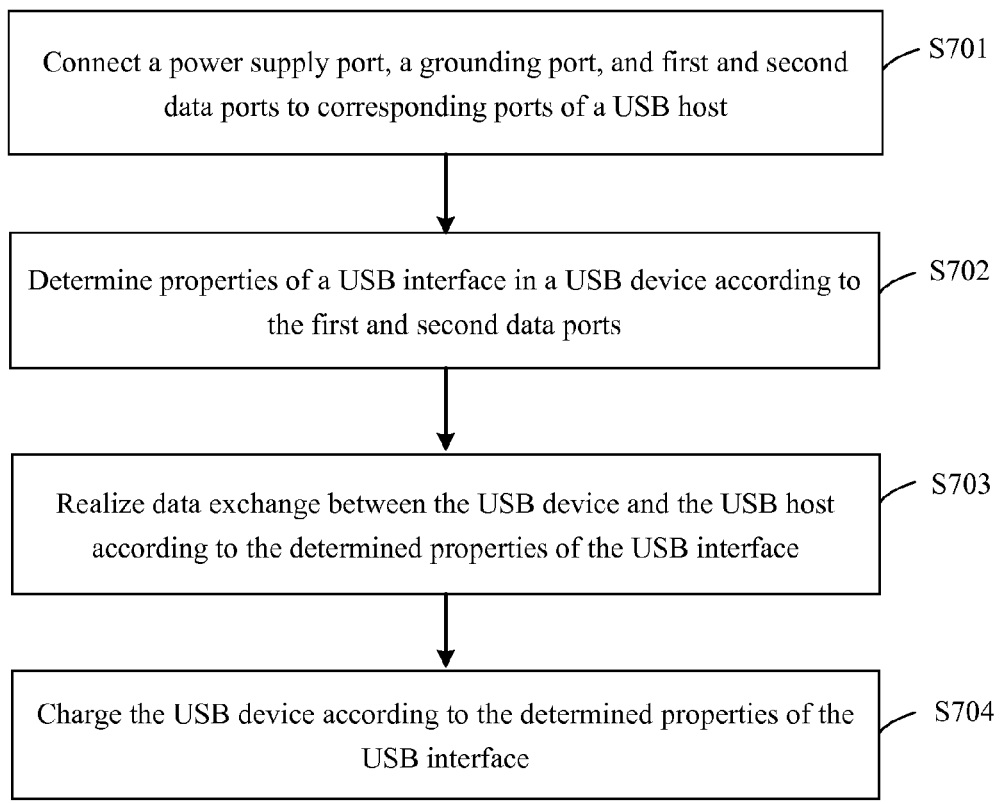
FIG. 7 is a flow diagram of an example method of controlling a USB device, in accordance with embodiments of the present invention.

Referring now to FIG. 7, shown is a flow diagram of an example method of controlling a USB device, in accordance with embodiments of the present invention. At S701, a power supply port (e.g., $V_{BUS}$), a ground port, and first (e.g., D+) and second (e.g., D–) data ports can be connected to corresponding ports of the USB host. At S702, properties of the USB interface can be determined according to signals at the first and second data ports. At S703, data exchange can occur between the USB device (e.g., to/from the storage unit 205) and the USB host according to the properties of the USB interface. At S704, the USB device can be charged (e.g., at a given current or current range or limit) according to the properties of the USB interface.

In addition, the charging current of the USB device can be regulated according to the properties of the USB interface. As discussed above, charging module 204, and in particular a current modulation circuit therein, can be used to regulate the charging current of battery 206. Also, USB host 100 and USB device 200 can be any suitable computers or devices. For example, the USB host may be a computer, a laptop, a standard USB charger, etc., and the USB device can be a mobile communication device, a music player, an iPad tablet, and so on.

Figure 8:
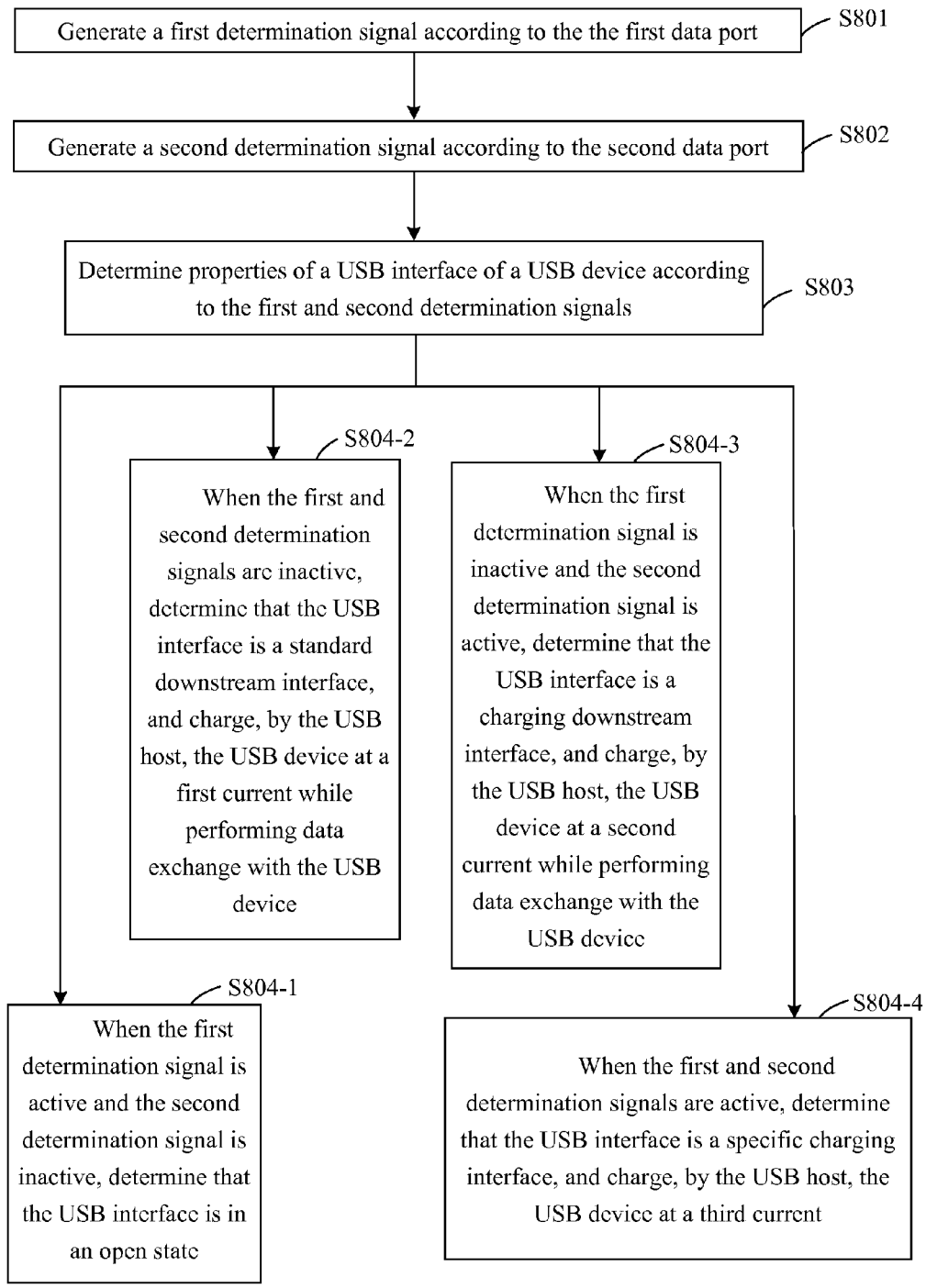
FIG. 8 is a flow diagram of a more detailed example method of controlling a USB device, in accordance with embodiments of the present invention.

Referring now to FIG. 8, shown is a flow diagram of a more detailed example method of controlling a USB device, in accordance with embodiments of the present invention. In this particular example, S702 in the flow diagram of FIG. 7 as to determining properties of the USB interface can also include the following steps. At S801, a first determination signal (e.g., $V_{de1}$) can be generated according a signal at the first data port. At S802, a second determination signal (e.g., $V_{de2}$) can be generated according to a signal at the second data port. At S803, properties of the USB interface can be determined according to the first and second determination signals. For example, processing unit 303 can receive determination signals $V_{de1}$ and $V_{de2}$, and may provide USB interface property indicators to data transmission module 203 and charging module 204.

At S804-1, when the first determination signal is active and the second determination signal is inactive, the USB interface can be determined to be in an open or non-connected state. At S804-2, when the first and second determination signals are both inactive, it can be determined that the USB interface is a standard downstream interface. Thus, the USB host and the USB device can charge the USB device at the first current while also performing data exchange.

At S804-3, when the first determination signal is inactive and the second determination signal is active, the USB interface can be determined to be a charging downstream port. In this case, the USB host and the USB device can charge the USB device at the second current while also performing data exchange. At S804-4, when the first and second determination signals are both active, it can be determined that the USB interface is a specific or dedicated charging interface. In this case, the USB host can charge the USB device at the third current, and data exchange between the host and device may not be performed.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A universal serial bus (USB) device, comprising:
a) an interface module having a power supply port, a ground port, and first and second data ports, wherein said interface module is configured to connect to corresponding ports of a USB host at a USB interface;
b) a property identification module coupled to said first and second data ports, wherein said property identification module comprises a processing unit configured to determine properties of said USB interface according to states of first and second determination signals;
c) a data transmission module configured to exchange data between said USB device and said USB host according to said determined properties;
d) a charging module coupled to said power supply port and said ground port, wherein said charging module is configured to charge said USB device based on said determined properties;
e) a first determination circuit comprising a pull-up resistor coupled to an input power supply and said first data port, and a first comparator configured to compare said first data port against a first reference voltage, and to generate said first determination signal; and
f) a second determination circuit comprising a pull-down resistor coupled to said second data port and ground, and a second comparator configured to compare said second data port against a second reference voltage, and to generate said second determination signal.

2. The USB device of claim 1, wherein:
a) when said first determination signal is active and said second determination signal is inactive, said processing unit is configured to determine that said USB interface is in an open state, and said data transmission module and said char in module are disabled;
b) when said first and second determination signals are inactive, said processing unit is configured to determine that said USB interface comprises a standard downstream interface, said data transmission module is configured to perform data exchange, and said charging module is configured to charge said USB device at a first current; and
c) when said first and second determination signals are active, said processing unit is configured to determine that said USB interface comprises a dedicated charging port, said data transmission module is disabled, and said charging module is configured to charge said USB device at a second current.

3. The USB device of claim 1, wherein said charging module comprises a current modulation circuit configured to modulate a charging current of said USB device according to said determined properties.

4. The USB device of claim 1, wherein said USB host comprises at least one of: a computer, a laptop computer, and a USB charger.

5. The USB device of claim 1, wherein said USB device comprises at least one of: a mobile communication device, a music player, and a tablet PC.

6. A method of controlling a universal serial bus (USB) device, the method comprising:
a) connecting, by USB interface, a power supply port, a ground port, and first and second data ports to corresponding ports of a USB host;
b) generating a first determination signal by comparing a signal at said first data port against a first reference voltage;
c) generating a second determination signal by comparing a signal at said second data port against a second reference voltage;
d) determining properties of said USB interface according to said first and second determination signals;
e) performing data exchange between said USB device and said USB host according to said determined properties; and f) charging said USB device according to said determined properties.

7. The method of claim 6, wherein:
a) when said first determination signal is active and said second determination signal is inactive, said determining said properties comprises determining that said USB interface comprises an open state;
b) when said first and second determination signals are inactive, said determining said properties comprises determining that said USB interface comprises a downstream port, and said charging said USB device comprises charging at a first current;
c) when said first determining signal is inactive and said second determination signal is active, said determining said properties comprises determining that said USB interface comprises a charging downlink interface, and said charging said USB device comprises charging at a second current; and
d) when said first and second determination signals are active, said determining said properties comprises determining that said USB interface comprises a charging port, and said charging said USB device comprises charging at a third current.

8. The method of claim 6, further comprising modulating a charging current of said USB device according to said determined properties.

9. The method of claim 6, wherein said USB device comprises at least one of: a mobile communication device, a music player, and a tablet computer.

10. A universal serial bus (USB) device, comprising:
a) an interface module having a power supply port, a ground port, and first and second data ports, wherein said interface module is configured to connect to corresponding ports of a USB host at a USB interface;
b) a property identification module coupled to said first and second data ports, wherein said property identification module comprises a processing unit configured to determine properties of said USB interface according to states of first and second determination signals, wherein a first determination circuit coupled to said first data port is configured to generate said first determination signal, and a second determination circuit coupled to said second data port is configured to generate said second determination signal;
c) a data transmission module configured to exchange data between said USB device and said USB host according to said determined properties;
d) a charging module coupled to said power supply port and said ground port, wherein said charging module is configured to charge said USB device based on said determined properties;
e) wherein when said first determination signal is active and said second determination signal is inactive, said processing unit is configured to determine that said USB interface is in an open state, and said data transmission module and said charging module are disabled;
f) wherein when said first and second determination signals are inactive, said processing unit is configured to determine that said USB interface comprises a standard downstream interface, said data transmission module is configured to perform data exchange, and said charging module is configured to charge said USB device at a first current; and
g) wherein when said first and second determination signals are active, said processing unit is configured to determine that said USB interface comprises a dedicated charging port, said data transmission module is disabled, and said charging module is configured to charge said USB device at a second current.

11. The USB device of claim 10, wherein said charging module comprises a current modulation circuit configured to modulate a charging current of said USB device according to said determined properties.

12. The USB device of claim 10, wherein said USB host comprises at least one of: a computer, a laptop computer, and a USB charger.

13. The USB device of claim 10, wherein said USB device comprises at least one of: a mobile communication device, a music player, and a tablet PC.

* * * * *